Oct. 4, 1932.                    W. F. THORNE                    1,880,221
                                 GRAIN SHOCKER
                         Filed July 21, 1928        9 Sheets-Sheet 1

Fig. 1

Inventor
William F. Thorne
By his Attorneys
Merchant and [illegible]

Oct. 4, 1932.  W. F. THORNE  1,880,221
GRAIN SHOCKER
Filed July 21, 1928   9 Sheets-Sheet 7

Inventor
William F. Thorne
By his Attorneys
Merchant and Kilgore

Patented Oct. 4, 1932

1,880,221

UNITED STATES PATENT OFFICE

WILLIAM F. THORNE, OF MINNEAPOLIS, MINNESOTA, ASSIGNOR TO CARL G. STRANDLUND, OF MINNEAPOLIS, MINNESOTA

GRAIN SHOCKER

Application filed July 21, 1928. Serial No. 294,517.

My invention has for its object to provide a highly efficient grain shocking machine attachment for binders, and to this end it consists of the novel devices and combinations of devices hereinafter described and defined in the claims.

In the accompanying drawings, which illustrate the invention, like characters indicate like parts throughout the several views.

Referring to the drawings.

The improved shocking machine is designed to be attached to any standard make of binder for common movement therewith and held in position to receive the tied bundles from the binder and with certain of the operating connections for the shocker extending to the binder. Of the parts of the binder illustrated for the purpose of showing the connections between the shocking machine and binder and the relationship between certain of the parts thereof and the method of operating or controlling certain other parts thereof, it is important to note in Fig. 4 the main frame 25 of said binder, bull wheel 26, jack pole 27, cutter bar 28, carrier 29, deck 30, butters 31, discharge shaft 32 and kicker arms 33.

Referring now in detail to the improved shocking machine, the numeral 34 indicates its main frame supported at its front end on a bull wheel 35 and an idle wheel 36 and at its rear end on a pair of caster wheels 37. Said bull wheel 35 is loosely journaled on the right-hand end of a fixed front axle 38 on the frame 34 and the idle wheel 36 is journaled on a bracket 39 mounted on the left-hand end of the axle 38 for vertical swinging movement longitudinally of the frame 34 to carry the idle wheel 36 to and from an operative position in which it rolls on the ground, see Figs. 1, 2 and 4.

When the device is attached to the binder, the bracket 39 will be turned into a horizontal position and secured in any suitable way to hold the idle wheel 36 off the ground so that when operating, the shocking machine is supported in part by the bull wheel 35 and caster wheels 37 and in part by the binder frame 25.

A pair of adjustable clamps are provided to detachably but rigidly connect the shocking machine to the right side of the binder frame 25 to receive the bundles from the deck 30. Each of these clamps includes a tubular member 40 rigidly bolted to the left-hand side member of the shocker frame 34 and a pair of half-round members 41 telescoped into the clamp member 40. On the outer ends of the clamp members 41 is a pair of laterally spaced upstanding screw-threaded studs 42 between which the right-hand side member of the binder frame 25 extends.

Figure 1:
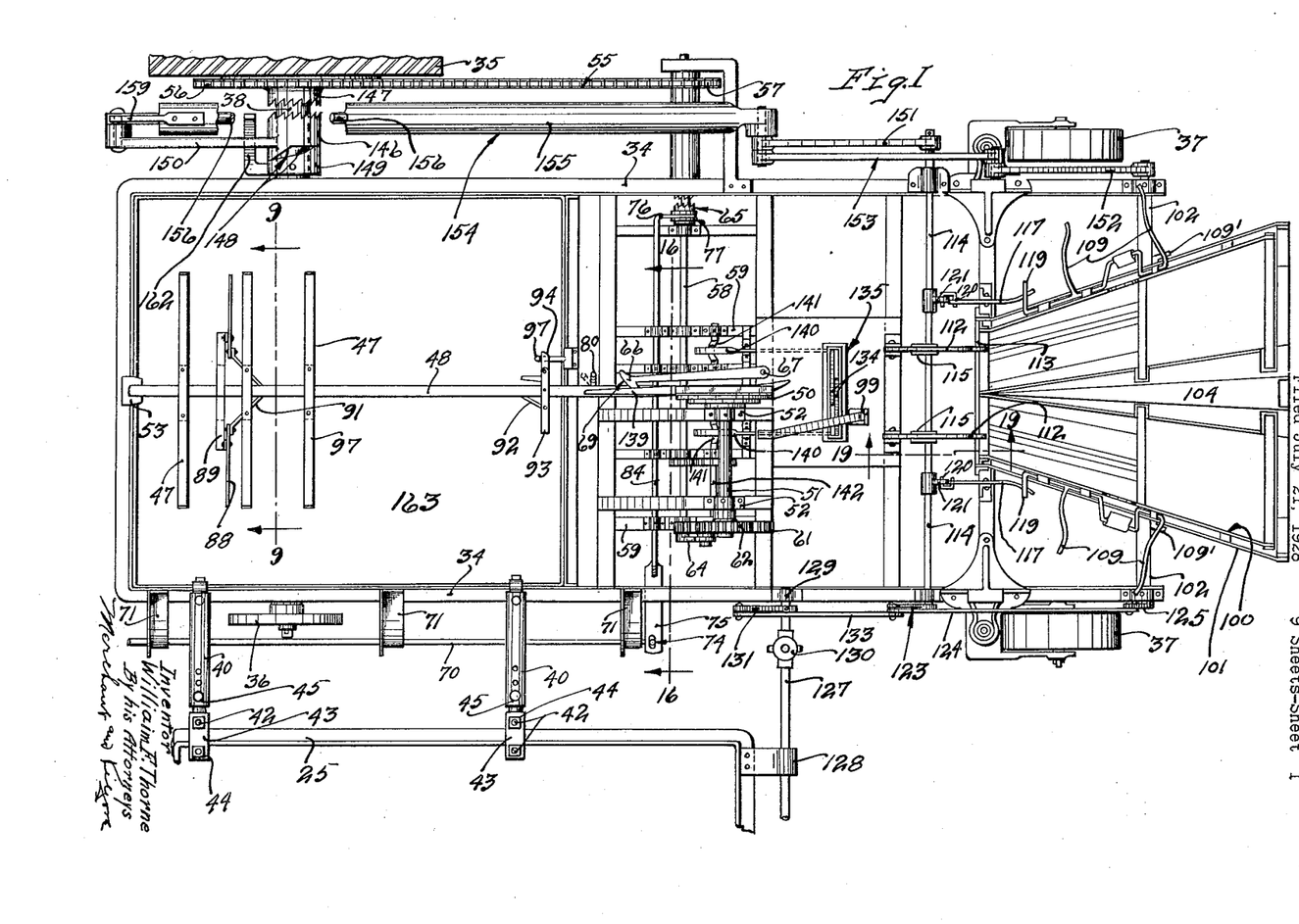
Fig. 1 is a plan view of the shocker, with some parts broken away and also illustrating a fragment of a binder frame to which the shocker is attached.
Figure 4:
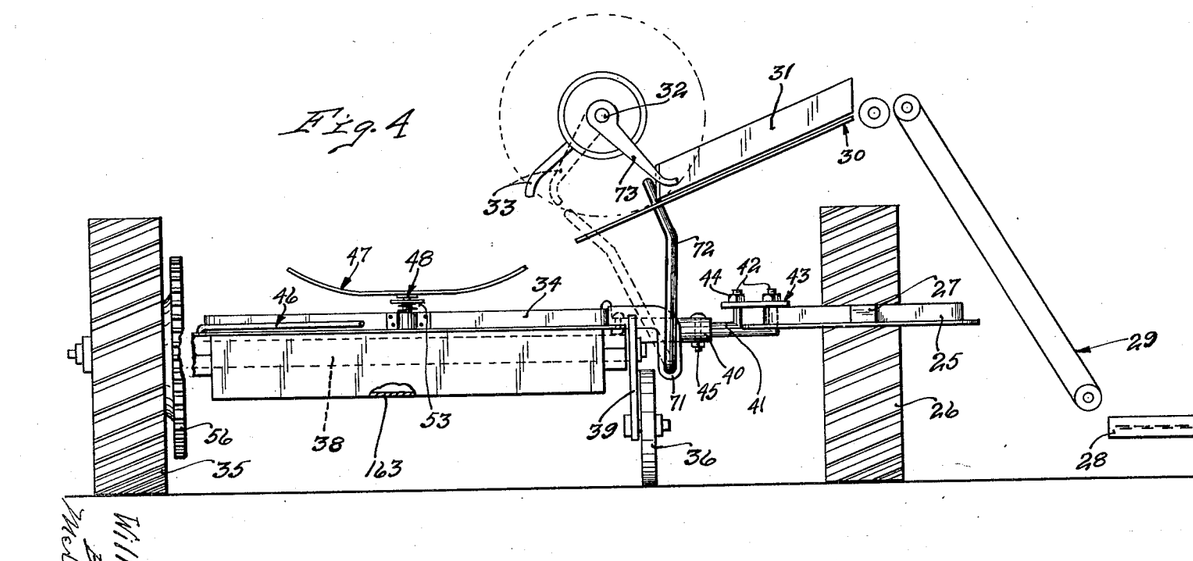
Fig. 4 is a front elevation of the shocker with some parts shown in different positions by means of broken lines and also illustrating, principally in diagram, a portion of the binder.

A tie-plate 43 connects the studs 42 above the frame 25 and nuts 44 on said studs hold the tie-plate 43 in position with the respective side member of the frame 25 clamped between the lower clamp member 41 and the tie-plate 43, see Figs. 1 and 4.

The clamp members 41 are rigidly secured to the clamp member 40 by a nut-equipped bolt 45 which extends through aligned holes in said members and it will be noted that the hole in the lower clamp member 41 is in the form of a longitudinally extended slot which permits said member to be longitudinally adjusted in respect to the other clamp member 41 to position the studs 42 for binder frame side members of different widths. By providing the clamp member 40 with a plurality of longitudinally spaced aligned holes for the bolt 45, the clamp members 40 and 41 may be longitudinally adjusted to position the shocker the proper distance from the binder.

The shocker is further attached to the binder by a draft rod 46, one end of which is attached to the front right-hand corner of the frame 34 and the other end of which is attached to the jack pole 27 about the axis of the bolt which pivotally connects the jack pole 27 and equalizer, said bolt, draft rod and equalizer not being shown. It may be here stated that a second draft bar, not shown, will be similarly attached at one of its ends to the jack pole 27 and its other end will be attached to the cutter bar platform. Said two draft rods diverge rearwardly from the jack pole 27 and the rear pull on the draft rod 46 by the shocker will offset the side draft of the binder caused by the movement of the cutter bar 28 through the grain.

As the bundles are successively discharged from the binder by the kickers 33, they are precipitated from the deck 30 into a basket 47 and carried thereby and deposited into a shock-forming receptacle, as will presently appear. A carrying arm 48 for the basket 47 is mounted in a diametrically extended channel 49 on the outer face of a disc 50 rigidly secured to the right-hand end of a short horizontal rock shaft 51 which extends transversely of the shocker at substantially the longitudinal center thereof and is journaled in bearing brackets 52 on the main frame 34.

The carrying arm 48 is held by the disc 50 for vertical swinging movement longitudinally of the shocker and the bundle-carrying basket 47 is mounted on the free end portion of said arm. Normally the arm 48 projects horizontally forward and holds the basket 47 directly in line with the deck 30 to receive the bundles therefrom, as best shown in Fig. 4. In this position of the carrying arm 48, its free end rests on a spring buffer 53 mounted on the front end member of the frame 34.

Figure 2:
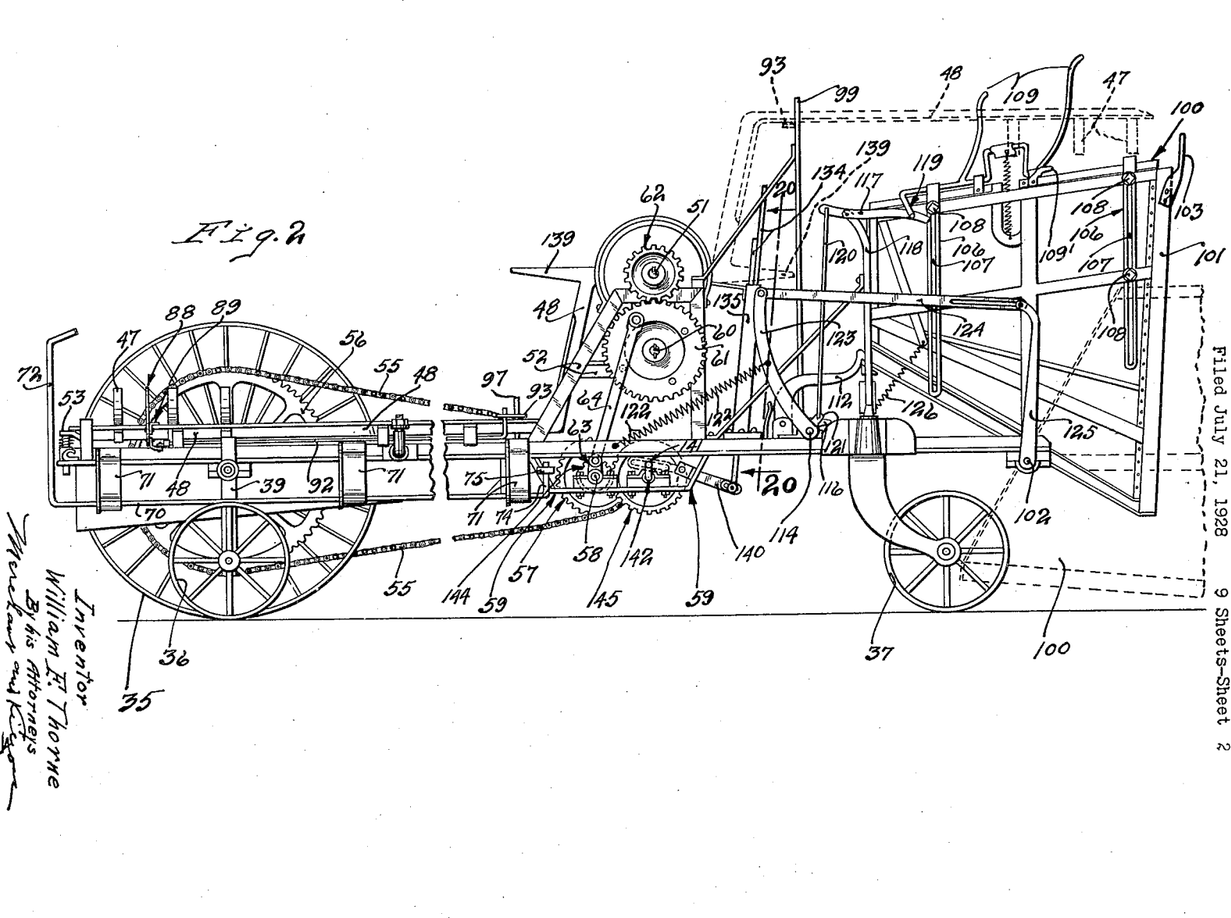
Fig. 2 is a left side elevation of the shocker with some parts broken away and other parts shown in different positions by means of broken lines.
Figure 3:
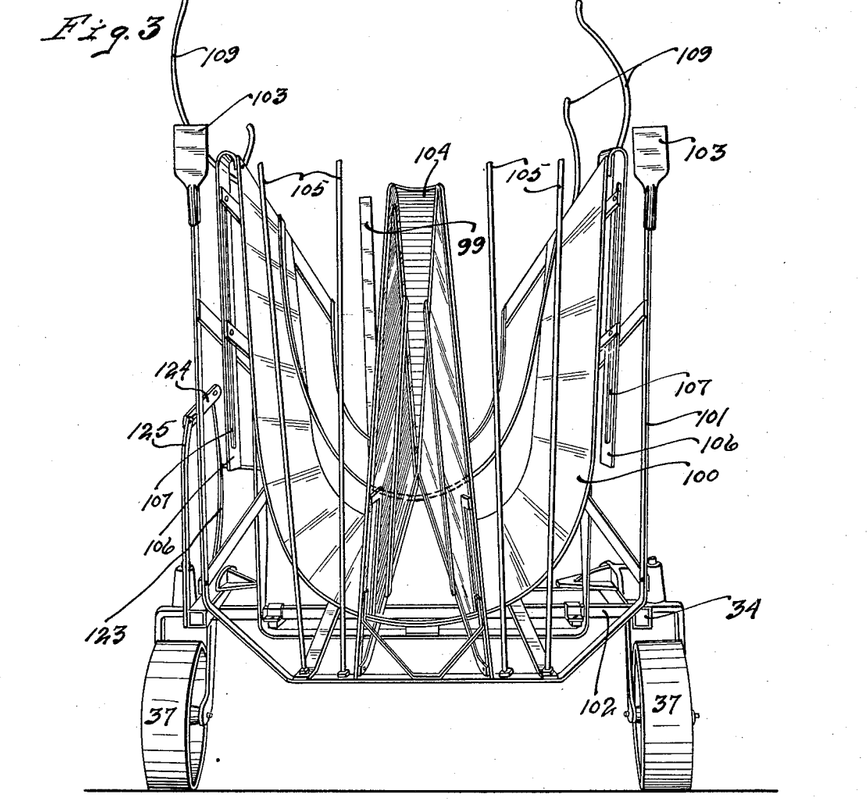
Fig. 3 is a rear elevation of the shocker.

The free end portion of the carrying arm 48 is materially offset from the mounted end thereof in the plane of its swinging movement so that when said arm projects forward, as shown by full lines in Fig. 2, it lies close to the upper surface of the frame 34 to receive a bundle in its basket 47 and when projecting rearward overlies the receptacle to release a bundle from the basket 47 into said receptacle, as shown by broken lines in Fig. 2.

Figures 9, 10, 11, 12, 13, 15:
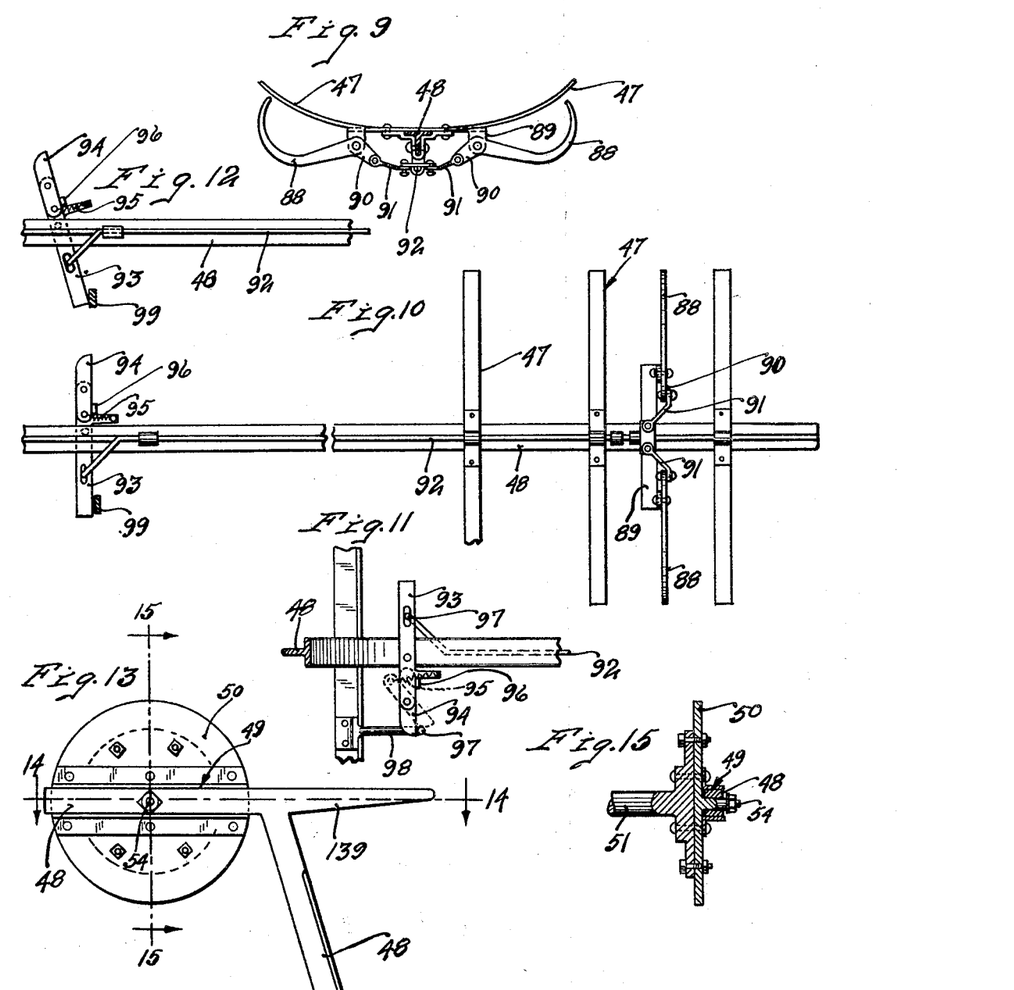
Fig. 9 is a view principally in elevation of the bundle-carrying basket, grapple hooks and carrying arm therefor with said arm sectioned on the line 9—9 of Fig. 1, on an enlarged scale.
Fig. 10 is a fragmentary bottom plan view of the parts shown in Fig. 9.
Fig. 11 is a fragmentary plan view of the carrying arm and operating mechanism for the grapple hooks, as shown in Fig. 10 and also illustrating a portion of the binder frame.
Fig. 12 is a fragmentary bottom plan view of certain of the parts shown in Fig. 10 with the operating mechanism for the grapple hooks shown in a different position.
Fig. 13 is a fragmentary side elevation of the carrying arm and operating disc therefor.
Fig. 15 is a detail view principally in section taken on the line 15—15 of Fig. 13.
Figure 14:
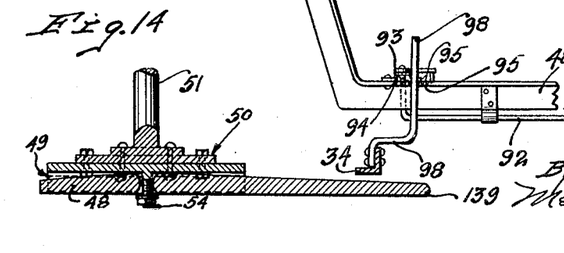
Fig. 14 is a detail view principally in section taken on the line 14—14 of Fig. 13.

The carrying arm 48 is secured to the disc 50 by a screw-threaded stud 54 rigidly secured to the disc 50 at the axis thereof and it is important to note that the side of the arm 48 that contacts with the disc 50 is curved and that the nut-equipped stud 54 extends loosely through said arm so as to permit a limited lateral swinging movement of the carrying arm 48 transversely of the shocker. The channel 49 securely holds the arm 48 from turning on the screw stud 54, as shown in Figs. 13, 14 and 15.

The following connections are provided for operating the rock shaft 51 from the bull wheel 35, to wit: A sprocket chain 55 runs over a large sprocket wheel 56 on the inner face of the bull wheel 35 and a relatively small sprocket wheel 57 loosely mounted on the right-hand end of a transverse shaft 58 journaled in bearing brackets 59 on the under side of the frame 34, see Fig. 2. A countershaft 60 is journaled in the bearing brackets 52 and located directly below the rock shaft 51 and has keyed to the left-hand end thereof a relatively large gear 61 that meshes with a gear 62 keyed to the rock shaft 51. The gear 61 is oscillated from the transverse shaft 58 by a crank 63 on the transverse shaft 58 and connected by a pitman 64 to said gear 61, see Figs. 1 and 2.

By reference to Fig. 2 it will be noted that the gear 61 is provided with four circumferentially spaced holes to which the pitman 64 may be attached.

For each complete rotation of the sprocket wheel 57 the gear 61 is oscillated through the arc of a circle which imparts a half turn to the gear 62 and thereby swings the carrying arm 48 180 degrees from a bundle-receiving position to a bundle-discharging position and then returns the same to said bundle-receiving position during another complete rotation of the sprocket wheel 57. As the gear 61 makes only a quarter rotation, the pitman 64 may be adjustably attached thereto so that said gear may be shifted circumferentially as the teeth thereof wear, thus materially increasing the life of said gear.

A sliding clutch 65 is provided for connecting the sprocket wheel 57 to the transverse shaft 58 each time a bundle is discharged from the binder into the basket 47, see Fig. 1.

The carrying arm 48 is locked by a long forwardly projecting hook 66 in its forwardly extended or normal position in which the basket 47 is positioned to receive a bundle from the binder. Said hook 66 is pivoted at 67 to the frame 34 for horizontal swinging movement transversely of the shocker. A coiled spring 68 attached to the hook 66 and anchored to the frame 34 normally and yieldingy holds the hook 66 interlocked with the transverse portion of the carrying arm 48 just above the free end portion thereof. On the free end of the hook 66 is a cam surface 69 arranged to be engaged by the carrying arm 48 during its return movement to cam said hook out of the path of movement of said arm against the action of the spring 68. After the carrying arm 48 has passed the hook 66, the spring 68 will again return said hook to normal position to lock the carrying arm 48 against lifting movement, see Figs. 1, 16 and 17.

For automatically operating the hook 66 to release the carrying arm and thereafter automatically set the clutch 65 to operate the carrying arm 48 to move the same from a bundle-receiving position to a bundle-discharging position and then return the same to its bundle-receiving position, the following connections are provided, to wit:

A long horizontal trip rod 70 is journaled in bearings 71 on the left-hand side of the frame 34, see Figs. 1 and 2. On the forward end of this trip rod 70 is an upstanding crank-acting trip arm 72 arranged to be engaged by a throw-out dog 73 keyed to the forward end of the discharge shaft 32 and arranged to engage the trip arm 72 once each rotation of said shaft 32, and immediately after the kickers 33 have discharged a bundle from the deck 30 into the basket 47, see Fig. 4. On the rear end of the trip rod 70 is a relatively short crank-acting arm 74 which extends through a relatively short slot in the left-hand end of a push rod 75 and thereby flexibly connects said trip rod and push rod. Said push rod 75 is mounted in bearings on the frame 34 for endwise sliding movement. The push rod 75 has on its right-hand end a laterally projecting shipper fork 76 which is connected to a shipper collar 77 on the clutch 65, see Figs. 1, 16 and 17.

The connections for setting the clutch 65 and releasing the lock hook 66 are normally held by a throw-out device with the trip arm 72 in position to be engaged by the throw-out dog 73 and with said clutch released. This throw-out device comprises a short upright rock shaft 78 having on its lower end a crank-acting arm 79 and on its upper end an oblique cam-acting arm 80. Said rock shaft 78 is journaled in a bearing on the frame 34 and the crank arm 79 is connected to the push rod 75 by a slotted lug 81 integrally formed with said rod.

Figures 16, 17, 22:
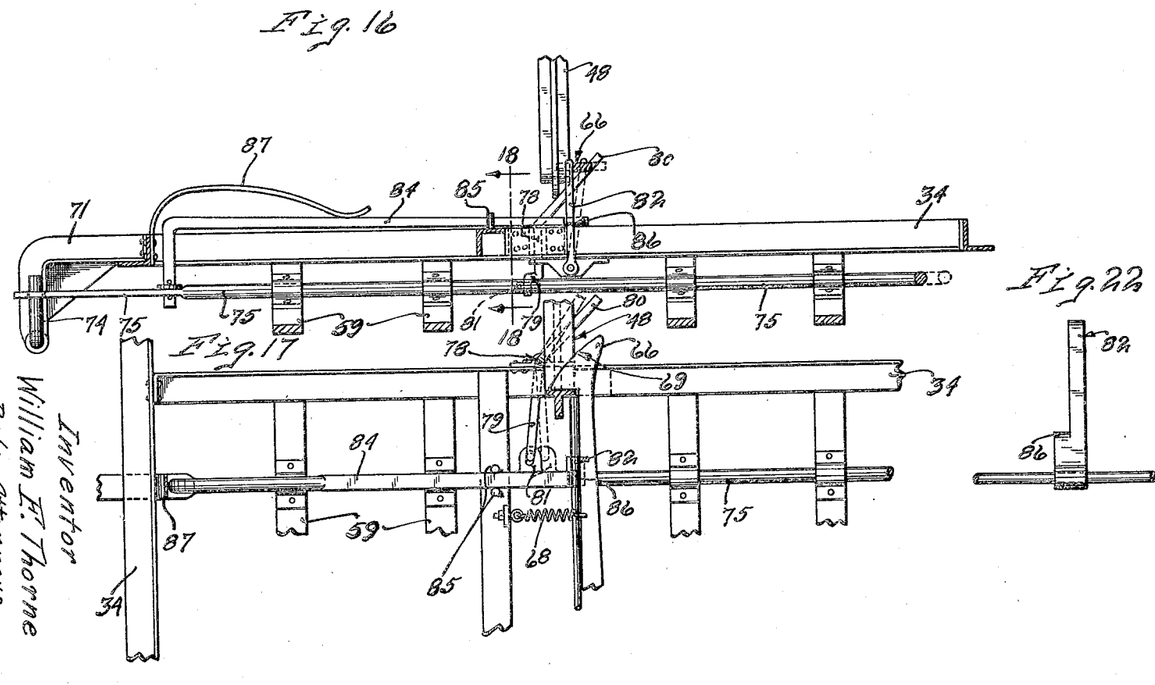
Fig. 16 is a view principally in transverse vertical section taken on the line 16—16 of Fig. 1, on an enlarged scale, some parts being shown in different positions by means of broken lines.
Fig. 17 is a plan view of the parts shown in Fig. 16.
Fig. 22 is a detail view of the lock hook tripping finger.
Figure 18:
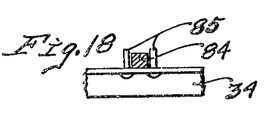
Fig. 18 is a fragmentary detail view with the push rod sectioned on the line 18—18 of Fig. 16.

A trip finger 82 for the lock hook 66 is pivoted to a bracket on the frame 34 and transversely engages said lock hook at its inner longitudinal edge, see Figs. 16 and 17. The trip finger 82 is operated to release the lock hook 66 by a push rod 84 which overlies the push rod 75 and extends parallel thereto. The left-hand end portion of the push rod 84 is bent laterally downward and secured to the push rod 75 to be operated thereby. Said push rod 84 at its free end portion rests on the frame 34 and works between a pair of guide pins 85 which hold said rod for straight endwise sliding movement on said frame with its free end positioned to engage a shoulder 86 on the trip finger 82, see Fig. 22.

A flat spring 87 anchored to the frame 34 overlies the inner end portion of the push rod 84, engages the same at its intermediate portion, and yieldingly holds the push rod 84 on the frame 34. It may be here stated that the connected end of the push rod 84 has sufficient play on the push rod 75 to permit the free end portion thereof to raise slightly from the frame 34. A movement of the connections for setting the clutch 65 by the throw-out dog 73 will also cause a movement of the push rod 84 to swing the trip finger 82 by its engagement with its shoulder 86 to swing said trip finger to the right and thereby move the lock hook 66 against the tension of its spring 68 and release the carrying arm 48.

After the trip finger 82 has released the lock hook 66, the push rod 84 will pass over the shoulder 86 and permit further right-hand movement of the push rod 75 to complete the setting of the clutch 65. The spring 87 will yield and permit the push rod 84 to ride over the shoulder 86.

A grapple comprising a pair of hooks 88 is provided for holding a bundle in the basket 47 during its movement from a bundle-receiving position to a bundle-releasing position over the shock-forming receptacle. These grapple hooks 88 are pivoted to lugs on a transverse bracket 89 rigidly secured to the carrying arm 48 within the basket 47 for movement transversely of said arm. Normally these grapple hooks 88 lie below the basket 47 and have on their inner ends short arms 90 attached by a pair of links 91 to one end of a push rod 92. This push rod 92 extends longitudinally under the carrying arm 48 and is mounted in bearings on said arm for endwise sliding movement to open and close the grapple hooks 88. The other end of the push rod 92 is bent laterally at an angle thereto and is loosely pivoted to one end of a transverse lever 93 intermediately pivoted to the carrying arm 48, see Figs. 9, 10, 11, 12 and 13.

The opposite end of the lever 93 from which the push rod 92 is attached has a pivotal extension 94. This extension 94 is yieldingly and normally held by a spring 95 against a stop 96 on the lever 93. Said spring 95 is anchored to the lever 93 and attached to the extension 94. It is important to note that the lever 93 is mounted on the offset or free end portion of the carrying arm 48 and that the outer end portion of the extension 94 is normally positioned rearward of an upstanding abutment 97 to be engaged thereby during the swinging movement of the carrying arm 48 from a bundle-receiving position to a bundle-releasing position. This abutment 97 is integrally formed on the outer end of an arm 98 on the frame 34. In this position of the lever 93 and its extension 94, said extension is held from turning on its pivot by the stop lug 96 when engaged by the abutment 97.

Owing to the peculiar relation between the abutment 97 and the axis about which the arm 48 swings, the lever extension 94 is held by the abutment 97 and thereby swings the lever 93 on its pivot during the lifting movement of the carrying arm from its bundle-receiving position and imparts an endwise movement to the push rod 92 which closes the grapple hooks 88 onto a bundle in the basket 47.

The grapple hooks 88 are open to release the bundle just before the carrying arm 47 reaches its rearmost position, as shown by broken lines in Fig. 2, by an upstanding trip rod 99 on the frame 34. During the movement of the carrying arm 48 to a bundle-releasing position, the end portion of the lever 93 to which the push rod 92 is attached, engages the trip rod 99, as shown in Fig. 12. Further movement of the carrying arm 48 to a bundle-releasing position will move the lever 93 held by the trip rod 99 and return the same to normal position, as shown in Figs. 2, 10 and 11, and thereby open the grapple hooks 88, as shown in Fig. 9, to release the held bundle and allow the same to be precipitated into the receptacle.

The shock-forming receptacle heretofore referred to is indicated by the numeral 100 and is mounted in a substantially correspondingly shaped skeleton carrier 101 in position to receive bundles one at a time from the basket 47. It may be here stated that the bundles are delivered to the basket 47 from the binder in a horizontal position longitudinally of the shocker with their butt ends projecting forward. The basket 47 during its movement from a bundle-receiving position to a bundle-discharging position turns the bundle therein end for end and deposits it in the receptacle 100 in a horizontal position with the butt end projecting rearward.

The carrier 101 extends longitudinally of the shocker, is normally held in a horizontal position and has open ends and an open top. Said carrier 101 at its longitudinal center is rigidly secured to a transverse square rock shaft 102 over which said carrier extends. The shaft 102 is journaled on the frame 34 at the extreme rear end thereof. A quarter turn of the shaft 102 will position the carrier 101 in an upright position rearward of the shocker with its open top at the back thereof and its open bottom closely positioned over the field. On the upper rear corners of the carrier 101 is a pair of shoes 103 which, when said carrier is turned into a vertical position, rest on the ground, support said carrier and cause the same to ride over the field at the back of the shocker.

Within the carrier 101 is an upright divider 104 which extends longitudinally through said carrier at the transverse center thereof and which divider includes a pair of flat side plates that are in rearwardly diverging relation and the upper edge thereof is inclined from substantially the bottom of the carrier 101 at the front thereof to the top of the carrier 101 at the rear thereof. In the open rear end of the carrier 101 is a plurality of laterally spaced upright bundle-retaining rods 105 rigidly secured to the bottom of said carrier. The receptacle 100 lies within the carrier 101 and has open ends and an open top with the divider 104 extending therein and separating said receptacle into two laterally spaced compartments adapted to alternately receive the bundles from the basket 47, as will presently appear.

The receptacle 100 is connected by slides 106 to the carrier 101 with freedom for a limited rearward movement in respect thereto when said carrier and receptacle are turned into a shock-releasing position. These slides 106 are arranged in front and rear pairs, reference being had to the normal position of the carrier 101 and are rigidly secured to the sides of the receptacle 100. These slides 106 have longitudinally extended slots 107 through which pairs of horizontally spaced roller-equipped bolts 108 on the carrier 101 project and rigidly connect the receptacle 100 to the carrier 101 except for the movement just referred to.

A pair of normally open gates 109 are hinged to the upper longitudinal edges of the receptacle 100 and are yieldingly held by coiled springs 110 in outwardly diverging relation against stops 109' on said receptacle. When the gates 109 are closed over the open top of the receptacle 100, the springs 110 are carried to opposite sides of dead centers from that in which they extend when said gates are open and thereby yieldingly hold said gates closed on the shock in the receptacle 100.

Normally, the carrier 101 at its front end rests on a spring buffer 111 mounted on the frame 34 and said carrier is held in this position by a pair of spring-held latch hooks 112 pivoted to said frame and normally engaging a transverse latch bar 113 on the bottom of said carrier 101 at the front end thereof.

Figure 19:
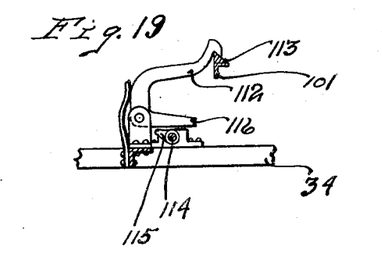
Fig. 19 is a fragmentary detail view with some parts sectioned on the line 19—19 of Fig. 1, on an enlarged scale.

The following connections are provided for first closing the gates 109 and releasing the latch hooks 112, to permit the carrier 101 to move under the action of gravity and thereby swing the receptacle 100 rearwardly and downwardly from its bundle-receiving position to a shock-setting position, to wit:

A transverse rock shaft 114 is journaled on the frame 34 directly under the latch hooks 112 and is provided with a pair of cams 115 arranged to engage crank-acting arms 116 on the latch hooks 112 and lift said latch hooks out of engagement with the latch bar 113, see Fig. 19. It is important to note that the cams 115 are normally spaced from the arms 116 so that the shaft 114 has a limited movement before the cams 115 engage the arms 116, for a purpose that will presently appear.

The gates 109 are closed in advance of the releasing of the latch hooks 112 by levers 117 intermediately pivoted to standards 118 on the frame 34. The long or rear ends of these levers 117 extend under crank arms 119 on the front ends of the gates 109, see Fig. 10. The short or front ends of the levers 117 are connected by long links 120 to short crank arms 121 on the rock shaft 114.

After the gates 109 are closed, the latch hooks 112 are released from the latch bar 113 by the action of the cams 115 on the arms 116 to permit the receptacle 100 to move into its shock-setting position, as previously described. The rock shaft 114 is yieldingly held in normal position by a coiled spring 122 anchored to the frame 34 and attached to the intermediate portion of a long crank arm 123 on the rock shaft 114. A long link 124 connects the free end of the arm 123 to the free end of a long crank arm 125 on the rock shaft 102. It is important to note that the link 124 is connected to the arm 125 by a slot and pin connection which permits sufficient movement of the rock shaft 114 to close the gates 109, and release the latch hooks 112 before the carrier 101 starts to move into a shock-setting position.

Three coiled springs 126 anchored to the frame 34 and attached to the front end of the carried 101 are provided for assisting in returning the carrier 101 and receptacle 100 to normal position, as will presently appear. The spring 122 prevents movement of the rock shaft 114 under the jarring action of the shocker during its travel over the ground that would tend to accidentally release the lock hooks 112.

The rock shaft 114 is manually-operated to close the gates 109 and release the latch hooks 112, as previously described by a trip rod 127 which extends parallel to the rock shaft 114 and is journaled in bearings 128 on the binder frame 25, only one of which is shown, and a bearing 129 on the left-hand side of the frame 34. This trip rod 127 between the bearings 128 and 129 is provided with a universal joint 130. The trip rod 127 is connected to the arm 123 on the shafts 114 by a crank-acting arm 131 on the trip rod 127 and the link 133 pivoted to the free ends of the crank arms 123 and 131, see Fig. 1. On the right-hand end of the trip rod 127 is an operating lever, not shown, closely positioned to the seat for the operator of the binder where the same may be easily manipulated.

At the time the receptacle 100 is moved into a shock-setting position, the bundles in the receptacle 100 slide slightly downward therein and their butt ends project between the retaining rods 105 and into the stubble and thereby hold the shock and at which time the slides 106 permit the receptacle 100 to stand still for a very short period of time while the carrier 101 continues to move with the shocker. This stopping movement of the receptacle 100 is highly important as to take off the vibration in setting the shock and to firmly hold the same in an upright position.

During further continued forward movement of the shock the two foremost bolts 108 are engaged as stops by the slide 106 and thereby cause the receptacle 100 to move with its carrier 101. This advance movement of the receptacle 100 brings its gates 109 into contact with the set shock which force the same partly open against the tension of the springs 110 and to such an extent that said springs are moved beyond dead centers and complete the opening movements of said gates.

To cause the basket 47 to deposit bundles into the receptacle 100, first on one side of the divider 104 and then on the other, there is provided a pair of laterally spaced upright deflector plates 134 mounted in a housing 135 for alternate raising and lowering movements. Said housing 135 is mounted on the frame 34 and the deflector plates 134 are held therein for straight-line movement by pins 136 rigidly secured to said housing and extend through vertical slots 137 in said plates.

Figures 6, 20, 21:
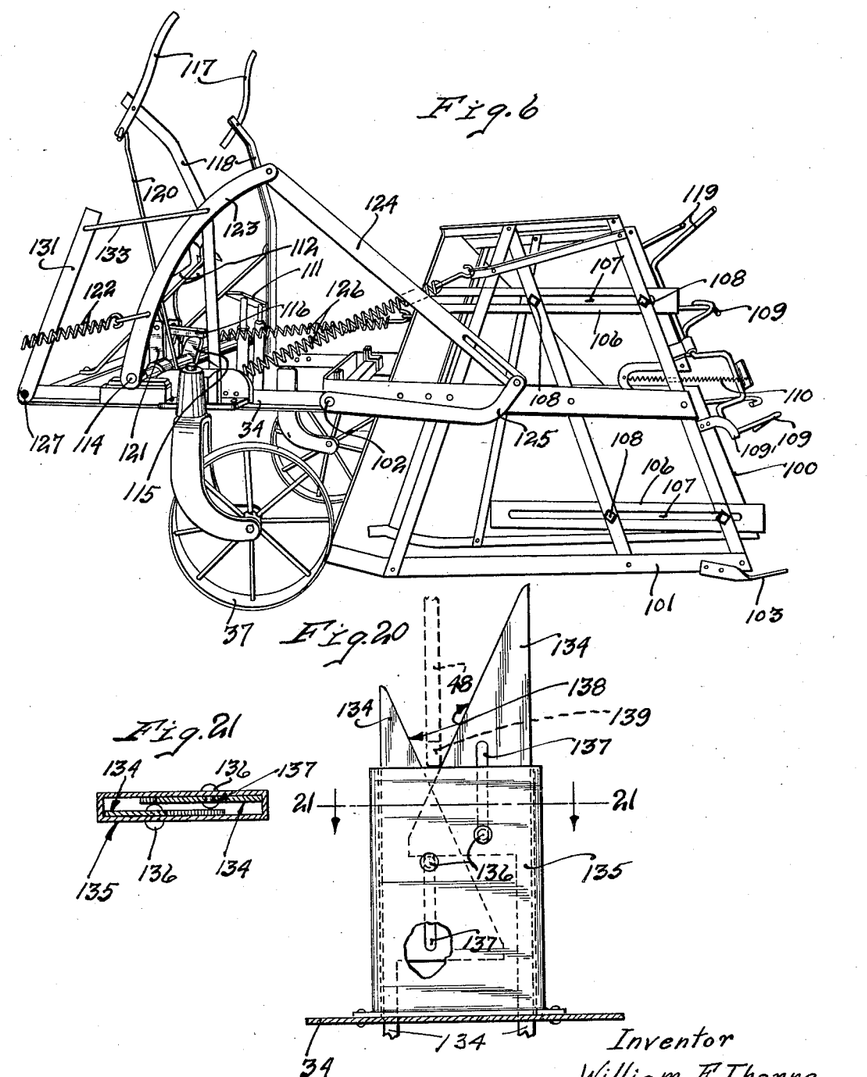
Fig. 6 is a perspective view of the rear end portion of the shocker with the receptacle in a shock-setting position.
Fig. 20 is a front elevation of the deflector blades and housing therefor with a portion of the shocker frame and carrying arm sectioned on the line 20—20 of Fig. 2, said carrying arm being indicated by broken lines.
Fig. 21 is a detail view in section taken on the line 21—21 of Fig. 20.
Figure 7:
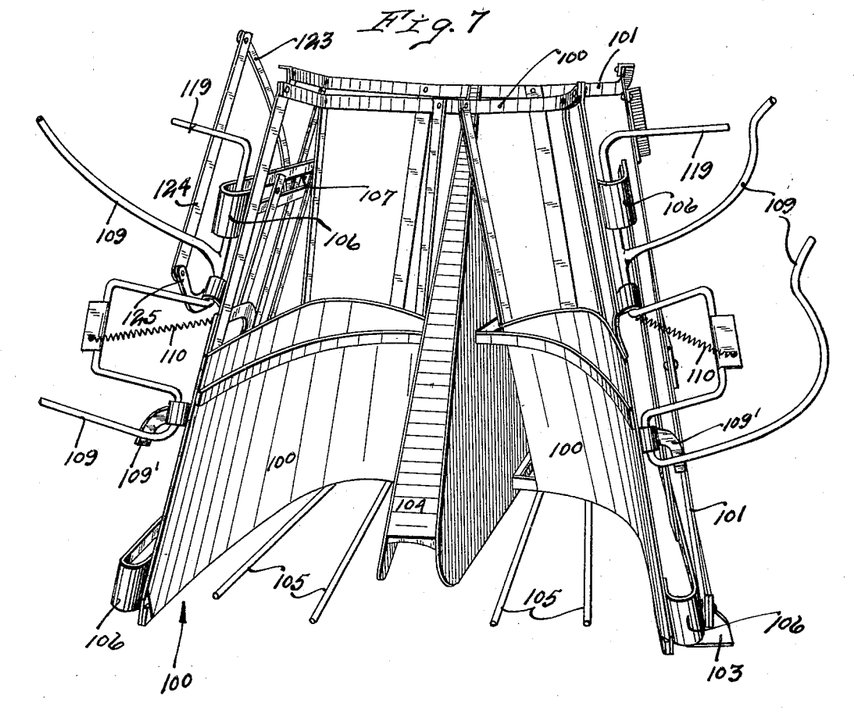
Fig. 7 is a perspective view of the receptacle in a shock-releasing position.
Figure 8:
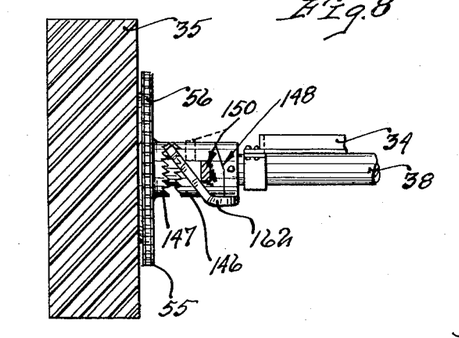
Fig. 8 is a front elevation of the shocker bull wheel, front axle and clutch.

The inner longitudinal edge portions of the deflector plates 134 are in the form of oblique cams 138 and which cams are in crotch-like arrangement, see Fig. 20. These cams 138 are alternately engaged by a deflecting pin 139 on the carrying arm 48 when the basket 47 is being moved to a bundle-releasing position. This engagement of the deflecting pin 139 swings the arm 48 laterally and hence the carrying basket 47 first toward one side of the shocker and then toward the other. This lateral swinging movement in the arm 48 is permitted by the peculiar way in which it is mounted upon the disc 50, as previously described. The deflector plates 134 are extended below the frame 34 and connected by a pair of levers 140 to a pair of cranks 141 on a crank shaft 142 journaled in bearings on the bearing bracket 59. Said levers 140 are intermediately fulcrumed on bearings 143 on the bearing bracket 59.

The cranks on the shaft 142 are set 180 degrees apart and said shaft is operated from the shaft 58 by a pinion 144 on the shaft 58 which meshes with a gear 145 on the crank shaft 142. The ratio of the pinion 144 and gear 145 is such that the crank shaft 142 makes a one-half rotation for each rotation of the shaft 58 and hence one of the deflector plates 104 is raised and the other lowered each time the basket 47 is operated to carry a bundle to the receptacle 100 and then returned to its bundle-receiving position.

Automatic means is provided for imparting the initial return movement of the receptacle 100 from a shock-setting position to a bundle-receiving position and the initial resetting movement of the manually-operated connections for the operator and which connections include the releasing mechanism for the latch hooks 112 and the mechanism for closing the gates 109 and which automatic means is set in motion by said manually-operated connections. It may be here stated that the springs 126 complete the return movement of the carrier 101 and receptacle 100 and that the arm 125 acting on the link 124 at the inner end of its slot connection therewith assists the spring 122 in returning the shaft 114 to normal position. During the return movement of the carrier 101 and receptacle 100 to normal position said receptacle, by its slide connection with said carrier, drops back into normal position in the carrier 101.

The automatic means, just referred to, includes a normally released sliding half clutch 146 on the front axle 38 between the frames 34 and bull wheel 35 and a co-operating half clutch 147 on the hub of said wheel. The half clutch 146, when turned on the axle 38 in a reverse direction from that in which the bull wheel 35 is moving when the shocker is travelling forward, is moved into mesh with the half clutch 147 by co-operating cam surfaces 148 on the inner face of the half clutch 146 and a fixed collar 149 on said axle. Crank-acting arms 150, 151 and 152 are rigidly secured to the half clutch 146 and rock shafts 114, and 102, respectively.

The arms 151 and 152 normally project forward in substantially parallel arrangement and are connected at their free ends by a link 153. The arm 150 also normally projects forward and a longitudinally extensible and contractable connecting member 154 connects the arms 150 and 151. Said connecting member 154 comprises a tubular section 155, the other end of which is pivotally attached to the free end of the arm 151 and a rod section 156, the outer end of which is pivoted to the free end of the arm 150.

Figure 5:
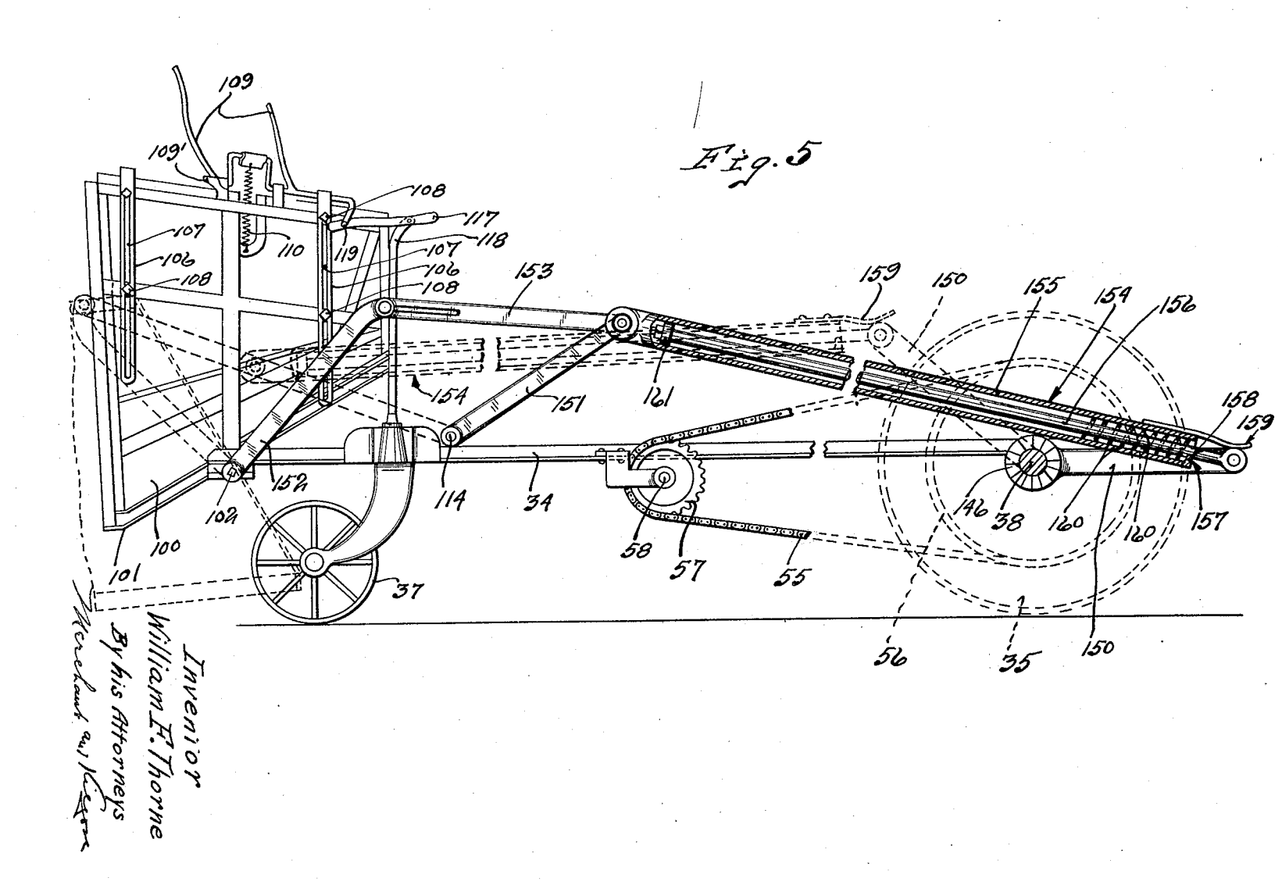
Fig. 5 is a fragmentary right side elevation of the shocker with some parts diagrammatically illustrated by means of broken lines and certain other parts being shown in different positions by means of broken lines.

When the half clutch 146 is released, the connecting member 154 is retracted and the sections thereof releasably held by a latch comprising an internal lock detent 157 in the free end of the tubular section 155 and a co-operating transverse lock notch 158 in the rod section 156, see Fig. 5. By reference to Fig. 5 it will be noted that the link 153 has a slot connection with the arm 152 and corresponds to a similar connection between the arm 123 and link 124 and serves the same purpose.

A leaf spring 159 anchored to the tubular section 155 bears on the rod section 156 at its pivotal connection with the arm 150 and yieldingly holds said rod with its lock notch 158 pressed onto the lock detent 157. A short coiled spring 160 encircles the rod section 156 within the tubular section 155 and engages the lock detent 157 as a base of resistance. A head 161 on the inner end of the rod section 156 engages the springs 160 to connect the tubular section 155 and rod section 156, as will presently appear.

During the manual movement imparted to the rock shaft 114 to close the gates 109 and release the latch hooks 112, the arm 151 is swung rearward and thereby sets the automatic means heretofore referred to into action for setting the clutch 146—147 and thereafter start the return movement of the receptacle 100 and the resetting of the manually-controlled operating connections which include the rock shaft 114 and other connections to the binder by imparting a like movement to the arm 151 through the connecting member 154, the sections of which are at this time connected by the lock detent 157 and lock notch 158.

During the initial rearward movement of the arm 151 the arm 150 remains stationary by reason of the slot and pin connection between the arm 150 and link 153. As previously stated, the receptacle 100 after the release of the latch hooks 112 moves under the action of gravity into a bundle-releasing position and at which time the arm 152 acting through the link 153 swings the arms 150—151 into their rearmost positions. The rearward swinging movement of the arm 150 rotates the half clutch member 146 on the axle 38 and during the later part of the movement the cam surfaces 148 are brought into contact with each other and set the clutch 146—147 before the arms 151—152 have reached their rearmost positions.

With the setting of the clutch 146—147 the arm 150 is reversed and started on its return movement and carries with it the rod section 156 while the tubular section 155 remains idle and at which time the lock detent 147 is cammed out of the lock notch 148 under the action of said forward movement of the rod section 156. During the forward travel of the rod section 156 its head 161 engages the spring 160 which again connects the sections 155—156 with a cushioning action and through the connecting arms 151—152 and link 153 starts the return movement of the receptacle 100 and which movement is completed by the springs 126.

During the final return movement of the arm 150 it engages a cam-acting finger 162 on the collar 149, is moved laterally inward thereby and slides the half-clutch 146 inward on the axle 38 and thereby releases the clutch 146—147 and throws the automatic means out of action.

A hopper grain pan 163 is mounted in the front end portion of the frame 34 beneath the basket 47 to receive and collect all shattered grain from the bundles as they are moved over the deck 30 and delivered to the basket 47. In the front end of the grain pan 163 is a normally closed door opening, not shown, through which the grain collected in said pan may be removed from time to time.

The operation of the above described invention may be briefly described as follows: It is evident that the shocker may be readily attached to a commercial binder without changing the action thereof in any manner whatsoever. As the bundles are discharged from the platform 30 by the kickers 33 they are received one at a time in the basket 47 which is operated in timed relation to the kickers 33 to carry a bundle to the receptacle 100 and be returned to normal position in time to receive the next bundle from said kickers.

During the initial movement of the basket 47 to a bundle-releasing position, the grapple hooks 88 are automatically closed onto the bundle therein to securely hold the same until positioned over the receptacle 100 where said grapple hooks are automatically opened to release the bundle. The alternately and automatically positioned deflector plates 114 as they are engaged by the carrying arm 48 swing said arm laterally first to one side of the shocker and then to the other to position the basket 47 for depositing the bundles alternately on opposite sides of the divider 104.

After a sufficient number of bundles have been deposited in the receptacle 100 to make a shock, the operator on the binder manipulates the lever closely positioned to him for operating the connections to the rock shaft 114. The initial movement of this shaft 114 operates the levers 117 through the connections 120 and 121 and thereby imparts sufficient opening movement to the gates 109 as to carry their springs 110 beyond dead centers and thereby cause said springs to complete the closing movements of the gates 109 and yieldingly hold the same closed onto the bundles within the receptacle 100.

At the time the springs 110 pass beyond dead centers, the cams 115 have been brought into engagement with the arms 116 and thereby operate the latch hooks 112 to release the carrier 101. Upon the release of these latch hooks 112, the carrier 101 and the receptacle 100 move under the action of gravity rearwardly and downwardly and thereby deposit the shock on the ground in an upright position.

With the shock resting on the ground, further advance movement of the receptacle 100 with the shocker is temporarily interrupted for a sufficient length of time to securely hold the shock and steady the same while the same is settling into position. During this time the divider 104 is being withdrawn from the two groups of bundles forming the shock and the retaining rods 105 are being drawn forward from under the shock. At the limit of the forward movement of the carrier 101 in respect to the stationary receptacle 100, the slides 106 have reached the limit of their movement on the carrier 101 and thereby impart a forward travelling movement to the receptacle 100 while in its shock-setting position. During this movement of the receptacle 100 the gates 109 are drawn around the shock with sufficient pressure to start their opening movement and carry their springs 110 beyond dead centers where they become active to complete the opening movement of said gates.

During the setting of the shock the automatic means for setting the clutch 146—147 has been set in action and said clutch set to impart the return movement of the receptacle 100 through the connections previously described and which return movement of the receptacle 100 is completed by the springs 126.

Just before the carrier 101 reaches its normal position the lock bar 113 engages the rounded free ends of the latch hooks 112 with cam actions and retracts said latch hooks sufficiently to permit the lock bar 113 to pass thereby. The return movement of the carrier 101 is cushioned by its engagement with the buffer 111 and at the time the carrier 101 strikes this buffer the same moves downward sufficiently to carry the lock bar 113 below the free ends of the retracted latch hooks 112 so as to permit said latch hooks to freely pass over the lock bar 113 under the action of their springs and re-engage the same at the time the respective end of the carrier 101 is raised by the rebound of the buffer 111.

The above described shocker-attachment for binders requires very little attention from the operator of the binder and very little effort on his part is required to operate the same. It is only necessary for him to observe when the receptacle 100 has a sufficient number of bundles to make a shock and then operate the closely positioned lever to start the mechanism into action to set the shock and automatically return all of the movable parts performing this action to normal positions.

The peculiar shape of the divider 104, as best shown in Fig. 4, is highly important in that it positions the two groups of bundles in the receptacle 100 so that their butt ends are spaced apart and their tops closely positioned, or, in other words, the two groups of bundles are inwardly inclined and brace each other to firmly hold the shock in position. The divider 104 is also of such shape that it is easily withdrawn from between the two groups of bundles at the time the shock is deposited on the ground.

The positioning of the two groups of bundles in diverging relation in a shock by the divider 104 also performs another important function in that it leaves an air space in the shock for the curing of the grain and prevents mildewing.

What I claim is:

1. In a shocker, a shock-forming receptacle mounted for movement by gravity from a bundle-receiving position to a shock-setting position, a lock for positively holding the receptacle in its bundle-receiving position, operating connections for releasing the lock, and automatic means independent of said operating connections set into action by a movement of the receptacle to its shock-setting position for imparting the initial return movement to the receptacle.

2. In a shocker, a shock-forming receptacle mounted for movement by gravity from a bundle-receiving position to a shock-setting position, a lock for positively holding the receptacle in its bundle-receiving position, operating connections for releasing the lock, and automatic means independent of said operating connections set into action by a movement of the receptacle to its shock-setting position for imparting the initial return movement to the receptacle and for resetting the operating connections.

3. The structure defined in claim 1 in further combination with a trip for throwing the automatic means out of action during the return movement of the receptacle.

4. The structure defined in claim 1 in further combination with a spring arranged to be placed under tension by the receptacle during its movement to a shock-setting position and co-operating with the automatic means for returning the receptacle to its bundle-receiving position.

5. In a shocker, a shock-forming receptacle mounted for movement by gravity from a bundle-receiving position to a shock-setting position, a gate for the receptacle, a lock for positively holding the receptacle in its bundle-receiving position, manually-controlled operating connections for imparting a closing movement to the gate and for releasing the lock, and automatic means independent of said operating connections set into action by a movement of the receptacle to its shock-setting position for imparting the initial return movement to the receptacle and for resetting the operating connections.

6. In a shocker, a shock-forming receptacle mounted to swing by gravity about a fixed axis for movement from a bundle-receiving position to a shock-setting position, a lock for positively holding the receptacle in its bundle-receiving position, operating connections for releasing the lock, a driven member, automatic means independent of said operating connections for imparting the initial return movement to the receptacle including a normally released clutch for connecting the receptacle to the driven member and a member operative to set the clutch by a movement of the automatic means set into action by a movement of the receptacle to its shock-setting position.

7. The structure defined in claim 6 in further combination with a second member operative to release the clutch by a movement of the automatic means during the return of the receptacle to its bundle-receiving position.

8. The structure defined in claim 6 in further combination with a second member operative to release the clutch by a movement of the automatic means during the return of the receptacle to its bundle-receiving position, and a connection from the automatic means to the operating connections for resetting said operating connections after it has released the lock.

9. The structure defined in claim 6 in which said automatic means includes a longitudinally extensible and contractable member, a latch normally holding the sections of said member in their contracted relation and operative to release said latch by a movement of one of said sections produced by the driven member and permit said sections to move into their extended relation and impart the initial return movement to the receptacle, said sections being adapted to be moved into their contracted relation under the action of the receptacle during its return movement to a bundle-receiving position and cause the latch to again connect said sections.

10. In a shocker, a shock-forming receptacle, a carrying arm mounted for vertical swinging, a bundle-holding basket on the carrying arm, connections including a push bar for operating the carrying arm to carry the basket from a bundle-receiving position to a bundle-discharging position over the receptacle, a grapple for holding the bundle in the basket, and operating connections for causing the grapple to hold a bundle in the basket and then release the same to the receptacle.

11. In a shocker, a shock-forming receptacle, a carrying arm mounted for vertical swinging movement, a bundle-holding basket on the carrying arm, connections for operating the carrying arm to carry the basket from a bundle-receiving position to a bundle-discharging position over the receptacle, a grapple for holding the bundle in the basket, and operating connections for the grapple including two abutments, one of which is attached to cause said connections to close the grapple during the initial movement of the basket from a bundle-receiving position and the other of which is arranged to cause said connections to open the grapple when the basket is in a bundle-releasing position.

12. The structure defined in claim 6 in which said operating connections further include a lever that directly engages said abutments and provided with a yieldingly held connection arranged to permit the lever to pass the first noted abutment during the return movement of the basket to a bundle-receiving position.

13. In a shocker, a shock-forming receptacle mounted for movement from a bundle-receiving position to a shock-setting position, a lock for holding the receptacle in a bundle-receiving position, operating connections for releasing the lock, and automatic means set into action by the operating connections for imparting a return movement to the receptacle.

14. In a shocker, a shock-forming receptacle mounted for movement from a bundle-receiving position to a bundle-setting position, a gate for the receptacle, a lock for holding the receptacle in its bundle-receiving position, operating connections for imparting a closing movement to the gate and thereafter releasing the lock.

15. In a shocker, a shock-forming receptacle mounted for movement from a bundle-receiving position to a bundle-releasing position, a gate for the receptacle, a spring movable from one side to the other of a dead center for holding the gate either in an open or a closed position, operating connections for moving the gate toward a closed position to carry said spring beyond a dead center and permit the same to complete the closing movement of the gate, said gate being arranged to be partially opened by a shock set by the receptacle to carry said spring beyond a dead center and permit the same to complete the opening movement of the gate.

16. In a traveling shocking machine, a shock-forming receptacle mounted on the machine for movement from a bundle-receiving position to a shock-setting position and with freedom for a limited movement longitudinally of the machine, whereby the receptacle may be temporarily held stationary when in a shock-setting position and during the advance movement of the machine.

17. In a travelling shocking machine, a carrier, a shock-forming receptacle mounted on the carrier for bodily movement, said carrier being pivotally mounted for movement to carry the receptacle from a bundle-receiving position to a shock-setting position, connections for moving the carrier from a position in which the receptacle is in a shock-setting position to a position in which the receptacle is in a bundle-receiving position, said carrier being moved by the machine during its advance in respect to the receptacle when in a shock-setting position to permit said receptacle to be temporarily held stationary by a shock therein and resting on the ground.

18. The structure defined in claim 17 in which the receptacle is moved inward on the carrier under the action of gravity during its movement by the carrier to a bundle-receiving position.

19. The structure defined in claim 17 which further includes a divider on the carrier constructed and arranged to be projected into the receptacle during its movement into a bundle-receiving position and withdrawn therefrom during movement of the carrier with the machine while the receptacle is being held stationary by the set shock.

20. In a travelling shocking machine, a carrier, a shock-forming receptacle mounted on the carrier for bodily movement, said carrier being pivotally mounted for movement to carry the receptacle from a bundle-receiving position to a shock-setting position, connections for moving the carrier from a position in which the receptacle is in a shock-setting position to a position in which it is in a bundle-receiving position, a yieldingly closed shock-holding gate on the receptacle, said carrier being moved by the machine during its advance in respect to the receptacle when in a shock-setting position to permit said receptacle to be temporarily held stationary by the engagement of its gate with the shock in the receptacle and resting on the ground.

21. The structure defined in claim 17 which further includes ground-engaging shoes on the carrier for supporting said carrier in part when the receptacle is in a shock-setting position.

22. The structure defined in claim 17 which further includes bundle-retaining members on the carrier for holding a shock at its butt during the movement of the receptacle from its bundle-receiving position to its shock-setting position, said retaining members being constructed and arranged to be withdrawn by the carrier from under the set shock while the receptacle is in said stationary shock-setting position.

23. In a travelling shocking machine, a carrier, a shock-forming receptacle slidably mounted on the carrier, said carrier being pivotally mounted on the machine for movement to carry the receptacle from a bundle-receiving position to a shock-setting position and for returning the same to said bundle-receiving position, means for moving the carrier to return the receptacle to its bundle-receiving position, said carrier being moved by the machine during its advance in respect to the receptacle when in a shock-setting position to permit said receptacle to be temporarily held stationary by a shock therein and resting on the ground.

24. The structure defined in claim 23 which further includes means for holding the carrier with the receptacle in a bundle-receiving position and in which the carrier is moved by gravity to position the receptacle in its shock-setting position.

25. The structure defined in claim 23 in which the receptacle is returned to normal position on the carrier during the movement of the carrier to return the receptacle to its bundle-receiving position.

26. The structure defined in claim 23 in which the carrier is moved by gravity to position the receptacle in its shock-setting position, and which further includes a spring constructed and arranged to be placed under tension by the movement of the carrier to position the receptacle in its shock-setting position and to assist in moving the carrier to return the receptacle to its bundle-receiving position when the receptacle is released from the set shock.

In testimony whereof I affix my signature.

WILLIAM F. THORNE.